(12) United States Patent
Melgaard et al.

(10) Patent No.: US 6,496,530 B2
(45) Date of Patent: Dec. 17, 2002

(54) CONTROL OF ELECTRODE DEPTH IN ELECTROSLAG REMELTING

(75) Inventors: David K. Melgaard, Albuquerque; Gregory J. Shelmidine, Tijeras; Brian K. Damkroger, Albuquerque, all of NM (US)

(73) Assignee: Sandia Corporation, Albuquerque, NM (US)

( * ) Notice: Subject to any disclaimer, the term of this patent is extended or adjusted under 35 U.S.C. 154(b) by 0 days.

(21) Appl. No.: 09/825,684

(22) Filed: Apr. 3, 2001

(65) Prior Publication Data

US 2002/0141475 A1 Oct. 3, 2002

(51) Int. Cl.$^7$ ............................ H05B 3/60; H05B 7/148
(52) U.S. Cl. .................................... 373/50; 373/105
(58) Field of Search ............................ 373/42, 47, 49, 373/50, 67, 70, 102, 104, 105

(56) References Cited

U.S. PATENT DOCUMENTS

| | | |
|---|---|---|
| 4,000,361 A | * 12/1976 | Bondarenko et al. ......... 373/50 |
| 4,075,414 A | 2/1978 | Thomas |
| 4,194,078 A | 3/1980 | Thomas |
| 4,303,797 A | 12/1981 | Roberts |
| 4,476,565 A | 10/1984 | Rashev et al. |
| 4,483,708 A | 11/1984 | Gfrerer et al. |
| 4,669,087 A | 5/1987 | Rasheva et al. |
| 5,331,661 A | 7/1994 | Maguire |
| 5,568,506 A | 10/1996 | Schlienger |
| 5,737,355 A | 4/1998 | Damkroger |
| 6,115,404 A | * 9/2000 | Bertram et al. ............... 373/70 |

\* cited by examiner

*Primary Examiner*—Tu Ba Hoang
(74) *Attorney, Agent, or Firm*—George H. Libman

(57) ABSTRACT

A method of and apparatus for controlling an electroslag remelting furnace by driving the electrode at a nominal speed based upon melting rate and geometry while making minor proportional adjustments based on a measured metric of the electrode immersion depth. Electrode drive speed is increased if a measured metric of electrode immersion depth differs from a set point by a predetermined amount, indicating that the tip is too close to the surface of a slag pool. Impedance spikes are monitored to adjust the set point for the metric of electrode immersion depth based upon one or more properties of the impedance spikes.

18 Claims, 3 Drawing Sheets

CONTROL OF ELECTRODE DEPTH IN ELECTROSLAG REMELTING

GOVERNMENT RIGHTS

The Government has rights to this invention pursuant to Contract No. DE-AC04-94AL85000 awarded by the U.S. Department of Energy.

BACKGROUND OF THE INVENTION

1. Field of the Invention (Technical Field)

The present invention relates to electroslag remelting ("ESR") electrode immersion depth control systems and methods.

2. Background Art

As shown in FIG. 1, ESR furnaces 10 have been utilized for over 40 years to refine metals and produce fully dense homogeneous ingots 22. The remelting takes place by immersing a consumable metal electrode 14 into a molten slag bath 18 that is resistively heated through applied power 24 to a temperature above the melting point of the metal. The electrode gradually melts, forming metal droplets that fall through the slag and collect in a pool 20 under the slag. The molten pool is contained within a water-cooled mold 16 that has a slightly larger diameter than the electrode. As the electrode melts, it must be translated downward by an electrode drive 12 at a rate related to the fill ratio and the melt rate, as specified by the system controller 26. A complicating factor is that a small amount of slag solidifies on the surface of the mold, changing the amount of metal needed to fill the mold, and changing the thickness of the molten slag on top of the ingot.

To produce a high quality homogeneous ingot with good surface quality, the deviations in the process—specifically immersion depth—need to be minimized. To optimize process efficiency and surface quality, the immersion depth must be maintained at a constant level, as shallow as possible. However, the shallower the immersion depth, the more sensitive the process is to input or external variables, hence, the more difficult it is to control. If the immersion depth is allowed to get too shallow, gaps can form between portions of the electrode surface and the slag, leading to arcing, atmospheric exposure, and deleterious oxidizing reactions. Conversely, too large an immersion depth, or too much variability in depth, can lead to poor surface and metallurgical quality in the ingot.

Again, the ESR process is used to refine metal, remove inclusions, and produce ingots having a uniform solidification grain structure and good surface quality. The immersion depth is an important parameter to control since it has a major effect on the thermal conditions governing melting and solidification. Deviations in immersion depth will alter the thermal environment of the process, inducing changes in the melting process (rate, efficiency, configuration, droplet location and size) and on solidification parameters (rate, direction, molten metal flow). As a result, immersion depth fluctuations will result in changes to the ingot's solidified grain structure, compositional homogeneity, and properties, and affect subsequent processing operations and final product quality.

Existing control methods drive the electrode in response to an error between the system voltage (which is related to immersion depth as described below) and a voltage set point. They utilize bi-directional electrode drive to oscillate around the set point, inherently resulting in constant fluctuation of the immersion depth. Shallower immersion depths have been shown to result in improved surface quality, hence improved process yields. The voltage of an ESR furnace system is most sensitive to immersion depth changes near the surface. Thus, it is more difficult to control electrode position at shallow immersions. As a result, existing control systems are only stable at a deeper immersion depth than would be associated with optimum surface quality.

No system currently exists to measure the depth directly, so it must be inferred from measured parameters of the process. At present, the ESR immersion depth is controlled in most systems by using the voltage and voltage swing, which is measure of the variation in the voltage. These methods are referred to as swing controllers.

The voltage is used because ESR furnaces primarily operate with a constant current power supply. At a simplified level, the slag can be viewed as a resistor, so the voltage is given by Ohm's Law:

$$V=I[d/(Ak)]$$

where V is the voltage, I is the current, and the resistance of the slag is approximated by the expression in the brackets where d is the distance between the electrode and the molten metal pool, A is the area of the electrode in contact with the slag, and k is the slag conductivity. However, there are numerous simplifications inherent in this treatment, so voltage is only a rough indicator of the electrode immersion. Additionally, the slag thermal environment and chemistry will change over the course of a melt, hence its conductivity is not constant. The amount of molten slag will also change during a melt due to slag plating out on the cold crucible walls, further altering the above relationship.

Consequently, while voltage is an effective immediate indicator of relative electrode position with respect to the surface of the slag, voltage alone has not been adequate to indicate or maintain a constant average immersion depth over time. Voltage swing cannot be directly related to the immersion depth via an equation such as the one presented above, nor can it be used as an instantaneous indicator. On the other hand, voltage swing is less sensitive to the factors that can change during the course of a melt. Regardless of slag amount, conditions, or properties, the isopotential lines within the slag will be compressed near the surface of the slag. As a result, increases in voltage swing can be reliably, but not quantitatively, related to a reduction in immersion depth.

Existing control systems utilize changes in voltage swing to adjust the voltage set point in response to changing process conditions. The basic method shown in FIG. 2 shows a schematic of an existing control system. Over the short term, the drive speed is determined by multiplying the voltage error ($V_{rms}-V_{sp}$) by a proportionality constant, $K_e$. This can be expressed by the equation: Drive Speed=$K_e$ ($V_{rms}-V_{sp}$) where $V_{rms}$ is the system voltage applied to the electrode and $V_{sp}$ is the voltage set point, a voltage indicative of desired electrode immersion depth. In the long term, the voltage swing is measured over a period of time and compared to a voltage swing set point. If the measured voltage swing is greater than the voltage swing set point, the immersion is taken to be too small, and the voltage set point is decreased. Conversely, if the measured voltage swing is smaller than the set point, the immersion depth is assumed to be too large, and the voltage set point is increased.

A more recently developed ESR control system was described in U.S. Pat. No. 5,737,355, to Damkroger, titled "Directly Induced Swing for Closed Loop Control of Electroslag Remelting Furnace". In this system, the electrode drive is the combination of a set unidirectional motion and a superimposed periodic fluctuation. This system then superimposes a periodic fluctuation of known amplitude (rather than electrode motion in response to a voltage error) to provide electrode motion relative to the isopotential lines in the slag, and thus generate the voltage swing signal. In the long term, positive deviations of voltage swing from the set point indicate too shallow immersion, and are used to increase the basic unidirectional drive speed. Negative deviations are used to do the opposite.

This directly induced swing system eliminated the confounding effect of the system's own drive response on voltage swing. However, it incorporates no short-term response to an error, which limits its ability to operate very near the slag surface. Later modifications of the directly induced swing sought to address this shortcoming by incorporating a voltage error response as was used in the original swing controllers. The average is usually a long term average of the drive speed. Over the long term, the voltage swing is measured and deviations from its set point are used to adjust the voltage set point, usually with a linear gain factor. To some extent these modifications mitigated the problem but the immersion depth was still too deep.

The pattern of periodic fluctuations in the impedance of the ESR process, referred to in this document as impedance spikes, are a phenomenon discovered in 1993 by Sandia National Laboratory researchers in the Specialty Metals Processing Consortium. These spikes are most conveniently calculated from measured electrode voltage and current and represent inherent fluctuations in the system's characteristic impedance that are not associated with electrode motion relative to the slag. Instead, they result from the variation in the melting of the electrode and the rapid change in slag/electrode contact area at shallow immersion depths. Initially the spike is the result of increased electrode melting, leading to a change in the immersion depth. Then contact resistance becomes a factor. The magnitude of contact resistance is considerably greater than the slag resistance, so changes in contact area between the electrode and the slag result in major changes in system impedance. These changes increase dramatically at shallow immersion depths. At shallow depths the impedance spikes are by far the most dominant forces in generating the natural variation of the voltage in ESR furnaces.

The existence of impedance spikes was unknown prior to 1993 because they were masked by the electrode drive response of voltage swing controllers and by melting at deeper immersion depths. Current was held constant, so the impedance spikes were manifested as voltage increases. The system's response was to drive the electrode downward, damping the spike. Because of the magnitude of the spikes, large responses were required, resulting in severe variations in immersion depth and process conditions and also deeper immersion depths were used to reduce the magnitude of the variation. Evaluation of past data shows that impedance spikes have long been a factor affecting ESR drive response.

In 1993, the application of directly induced swing controllers revealed the existence of the impedance spikes. The spikes were not damped by any short term response to voltage errors, and although the electrode was being driven down at the average speed required to match the fill ratio for the melt rate, the spikes appeared as rapid increases in system voltage.

FIG. 3 shows the voltage rise in response to two impedance spikes at a shallow immersion depth. The large spike at 25 seconds is believed to represent a larger increase in contact resistance than the smaller spike at 50 seconds. The rapid deceases in the voltage at the end of the spikes is a result of the controller's voltage error response. In order to keep the electrode from arcing (which would occur if the electrode lost contact with the slag pool), the controller responds to the dramatic overvoltages by driving the electrode down at a rapid rate.

Existing control systems use very high electrode drive speeds to overcome the impedance/voltage spikes near the slag surface. The gain of their voltage response is necessarily much higher than needed to respond to non-spike fluctuations, so the system overreacts much of the time and drives the electrode excessively up and down in the slag. Part of that is by design, because the controller needs to generate the voltage swing. Also, because the spikes are asymmetric but current systems respond symmetrically to the voltage error, the systems tend to drive the electrode up in the slag too fast, leading to instabilities. The resulting average immersion depths are too deep, and subject to both short and long term fluctuations.

An additional result is that the spikes dominate the voltage swing calculations. Because of the rapid change in voltage close to the surface, the swing calculations will vary significantly at shallow immersions, leading to oscillations in the voltage set point. These changes cause spurious variations in the immersion depth.

SUMMARY OF THE INVENTION
(DISCLOSURE OF THE INVENTION)

A primary object of the present invention is providing for more stable ESR furnace control.

A primary advantage of the present invention is that it permits shallower, more stable electrode immersion depths than previous systems, resulting in higher quality ingots.

To achieve the foregoing and other objects, and in accordance with the purpose of the present invention, as embodied and broadly described herein, the present invention may comprise a method of controlling the electrode drive speed on an electroslag remelting furnace including the steps of: initially driving the electrode at a nominal rate consistent with the melting rate and geometry; adjusting the electrode drive speed by an amount proportional to the difference between a measured metric of the proximity of the electrode tip to the surface of the slag pool and a set point, and additionally adjusting electrode drive speed by a second amount if a measured metric of the proximity of the electrode tip to the surface of the slag differs from a set point by a predetermined amount; wherein the second amount is greater than the first amount. Additionally it comprises a means for periodically adjusting the first set point by monitoring characteristics related to the impedance spikes and determining if the overall immersion depth needs to be changed.

Other objects, advantages and novel features, and further scope of applicability of the present invention will be set forth in part in the detailed description to follow, taken in conjunction with the accompanying drawings, and in part will become apparent to those skilled in the art upon examination of the following, or may be learned by practice of the invention. The objects and advantages of the invention may be realized and attained by means of the instrumentalities and combinations particularly pointed out in the appended claims.

BRIEF DESCRIPTION OF THE DRAWINGS

The accompanying drawings, which are incorporated into and form a part of the specification, illustrate several embodiments of the present invention and, together with the description, serve to explain the principles of the invention. The drawings are only for the purpose of illustrating a preferred embodiment of the invention and are not to be construed as limiting the invention. In the drawings.

DESCRIPTION OF THE PREFERRED EMBODIMENTS (BEST MODES FOR CARRYING OUT THE INVENTION)

The present invention is of a control method and apparatus for controlling an electroslag remelting (ESR) furnace, and specifically to improve control of the depth to which an electrode is immersed in the molten slag (electrode immersion depth). The invention utilizes a system metric indicative of the immersion depth, such as system voltage, to make small, frequent corrections and large, infrequent corrections to drive speed. The system further utilizes a characteristic of the system that is also indicative of immersion depth, such as the large, rapid changes in voltage associated with the impedance spikes, to adjust the small, frequent corrections.

In the preferred embodiment, this system superimposes a relatively large specific, calculated response to impedance spikes onto an essentially unidirectional drive signal, in order to achieve a more constant immersion depth for a specific electrode melt rate and geometry. By isolating this response to the impedance spikes, a significantly reduced response is needed when spikes are not present for other factors related to immersion depth. Existing systems do not isolate the spikes, so they must make a larger response to a confounded mix of the process information, which induces more variability in the immersion depth. The essentially unidirectional drive of this invention does not utilize the periodic variations of the aforementioned Damkroger patent; rather, it drives the electrode essentially only towards the molten pool. The electrode is reversed only if necessary to overcome inertia that has moved the electrode too deep into the pool. The invention allows the electrode to be controlled at a shallower immersion depth, in a more consistent and stable fashion than is achieved with existing control methods. Both of these outcomes lead to the production of a superior quality ingot, in terms of internal metallurgical structure and surface quality.

While the responses described above provide a more consistent drive speed than previous systems, more drastic action is necessary if the electrode tip is too near to the slag surface. Accordingly, the system also imposes a significantly larger momentary increase in drive speed in response to every large voltage spike to ensure that the electrode tip remains in the slag pool.

Figure 1:
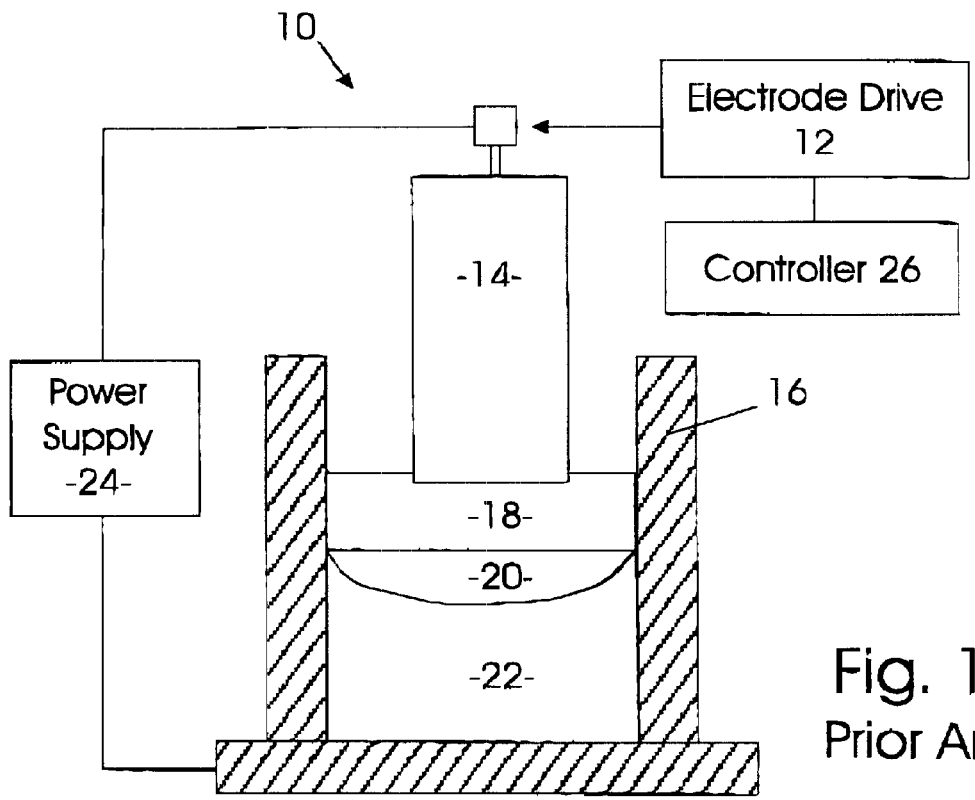
FIG. 1 is a schematic of an ESR furnace, as known in the prior art, but in which a modified control system and method are employed in the present invention.
Figure 2:
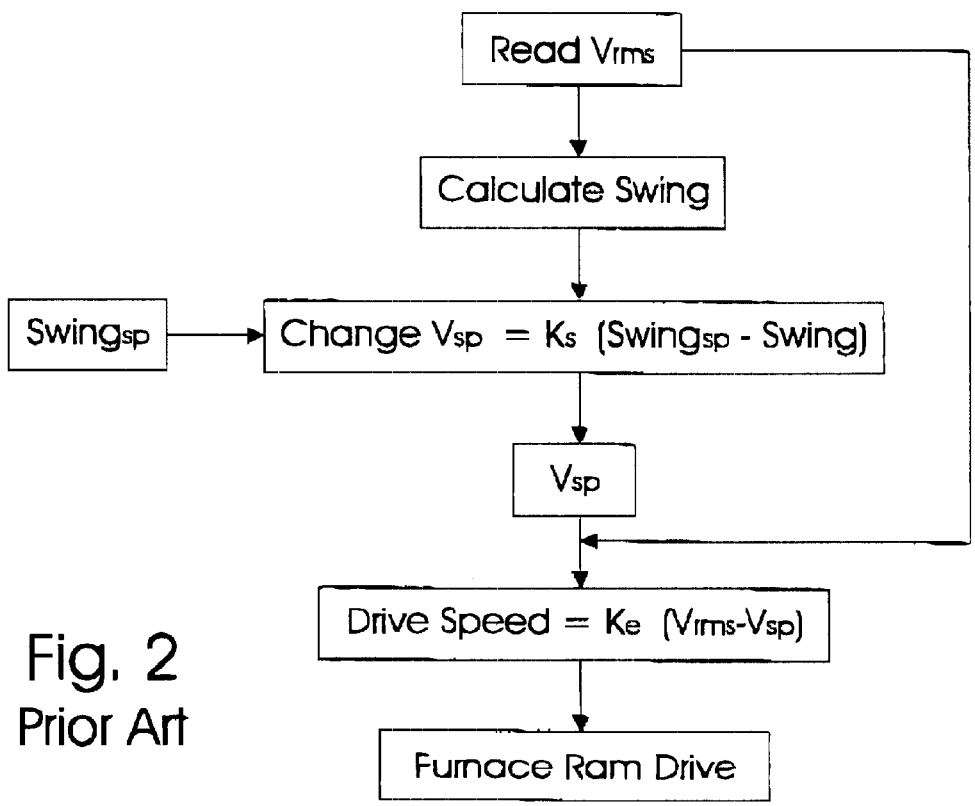
FIG. 2 is a flow chart for prior art ESR immersion depth control.
Figure 3:
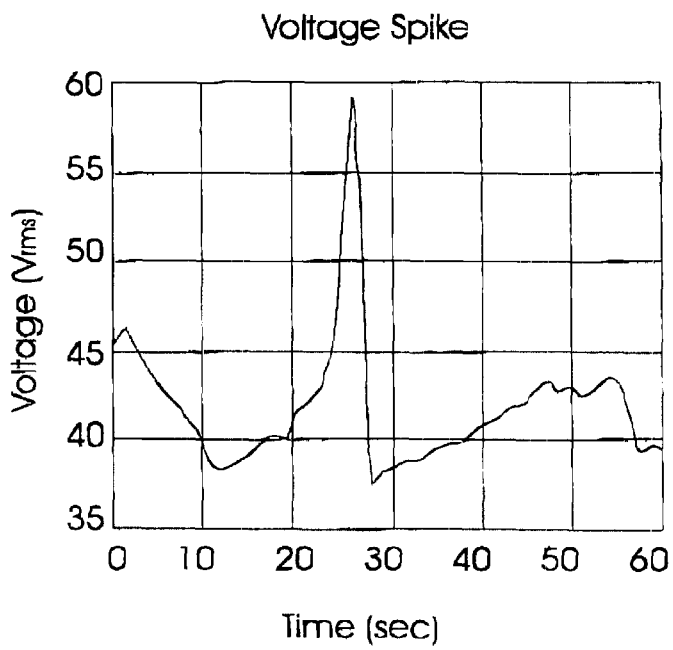
FIG. 3 illustrates a voltage signal resulting from two impedance spikes in ESR.

The voltage spikes ($V_{rms}$) of FIG. 3 may be used to illustrate features of the impedance spikes that are utilized in the preferred embodiment of this invention. The large spike at 25 seconds is seen to have a relatively constant slope ($\Delta V/\Delta t$) between 10 and 22 seconds, and a much greater slope to the peak of the pulse at 27 seconds. The smaller spike at 50 seconds is seen to have approximately the same constant slope as the first pulse between from 30 to 48 seconds, after which no distinct peak was formed. As will be seen later in conjunction with FIG. 7, the slopes of impedance spikes have even greater variation than the voltage spikes. Although the physical changes in the process which cause these spikes to be different are not understood, the closer the electrode tip is to the surface of the molten slag, the more often spikes like the first one will occur.

Figure 4:
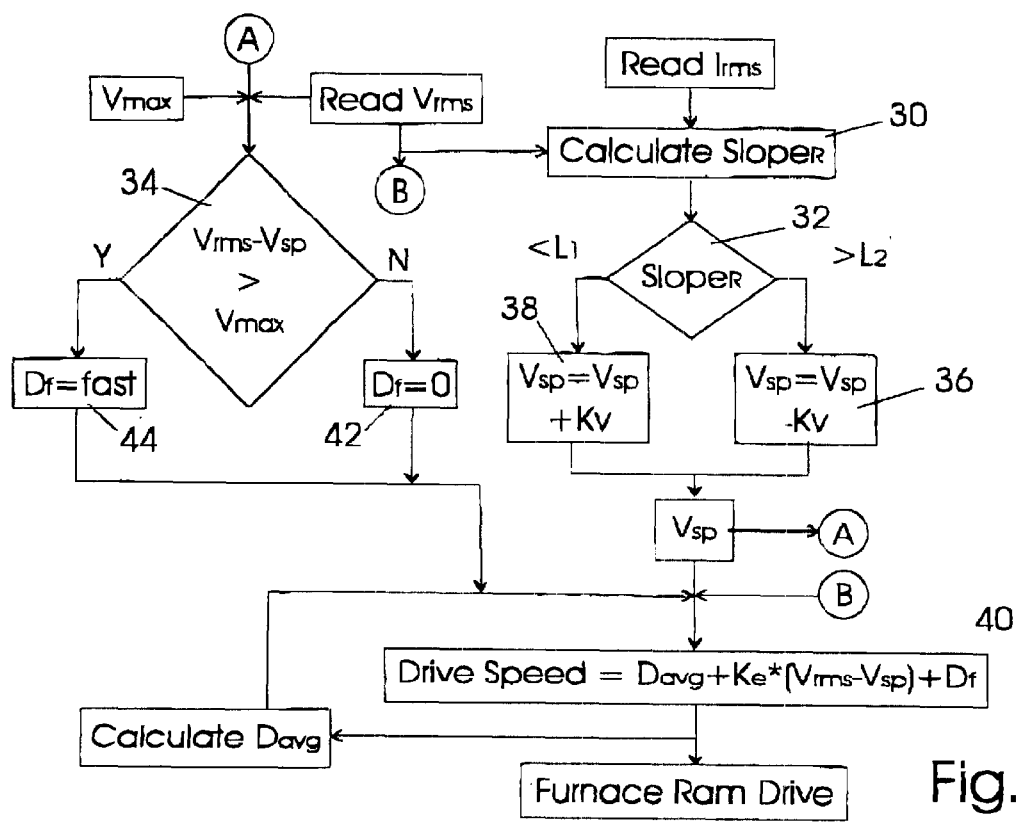
FIG. 4 is a flow chart for the impedance spike depth control method of the invention.

A flow chart of a preferred depth control method of the invention is provided in FIG. 4. The drive speed in the short term is shown in box 40 to be: Drive Speed=$D_{avg}$+$K_e^*$($V_{rms}$-$V_{sp}$)+$D_f$, where $D_{avg}$ is the average speed of the electrode over the last few minutes, $K_e^*$ is the gain in response to the voltage error ($V_{rms}$-$V_{sp}$), $V_{rms}$ is the measured rms Voltage between the electrode and ground, $V_{sp}$ is the voltage set point, and $D_f$ is an added speed factor in response to large voltage spikes. The average speed is initially the unidirectional drive speed that corresponds to a given melt rate and system geometry. The second term, $K_e^*$($V_{rms}$-$V_{sp}$), the voltage error term, is similar to that used in existing voltage swing controllers and is used to adjust electrode speed by an amount proportional to the slight differences in system voltage from the set point voltage. In the controller of the invention, however, the voltage error gain, $K_e^*$ is considerably less (at least an order of magnitude smaller) than in prior art controllers. The lower gain keeps the electrode immersion in the slag relatively constant. This prevents excess electrode motion, allowing shallower immersion depths to be maintained, and prevents the electrode from excessively moving across the isopotential lines, generating spurious voltage changes.

Because $K_e^*$ is small, a response to large voltage spikes must be included to prevent the electrode from emerging from the slag, causing arcing and leading to deleterious results. The term $D_f$ is either zero, as illustrated in box 42, and has no effect on drive speed, or corresponds to the high drive speed of box 44 that is engaged when the difference between the system voltage and the set point exceeds a deviation limit, $V_{max}^*$ in decision box 34. Although settings for $D_f$ depend on the application, it ordinarily should preferably be an order of magnitude or more, greater than the average speed.

In the operation of the invention as shown in FIG. 4, the slope of the impedance is calculated continuously by box 30 and the rate at which a high slope is detected is applied to decision box 32 to determine if it falls outside a predetermined range of values. If the electrode tip is remaining too close to the surface of the molten slag 18, the rate of detected high slopes will be greater than a first set constant $L_2$, and the voltage set point $V_{sp}$ will be decreased through the function of box 36. That change will cause the drive speed to increase momentarily through the function illustrated in box 40, which causes the electrode to operate at a slightly deeper effective immersion depth. If high slopes are not detected more often than a lower second set constant $L_1$, then the electrode is immersed too deeply in molten slag 18. The function of box 38 then causes $V_{sp}$ to increase, thereby slowing the drive speed momentarily and decreasing the effective immersion depth. It is preferred in most applications to check the voltage set point in this way continuously but to change the set point only fractions of a volt only every few minutes.

Figure 5:
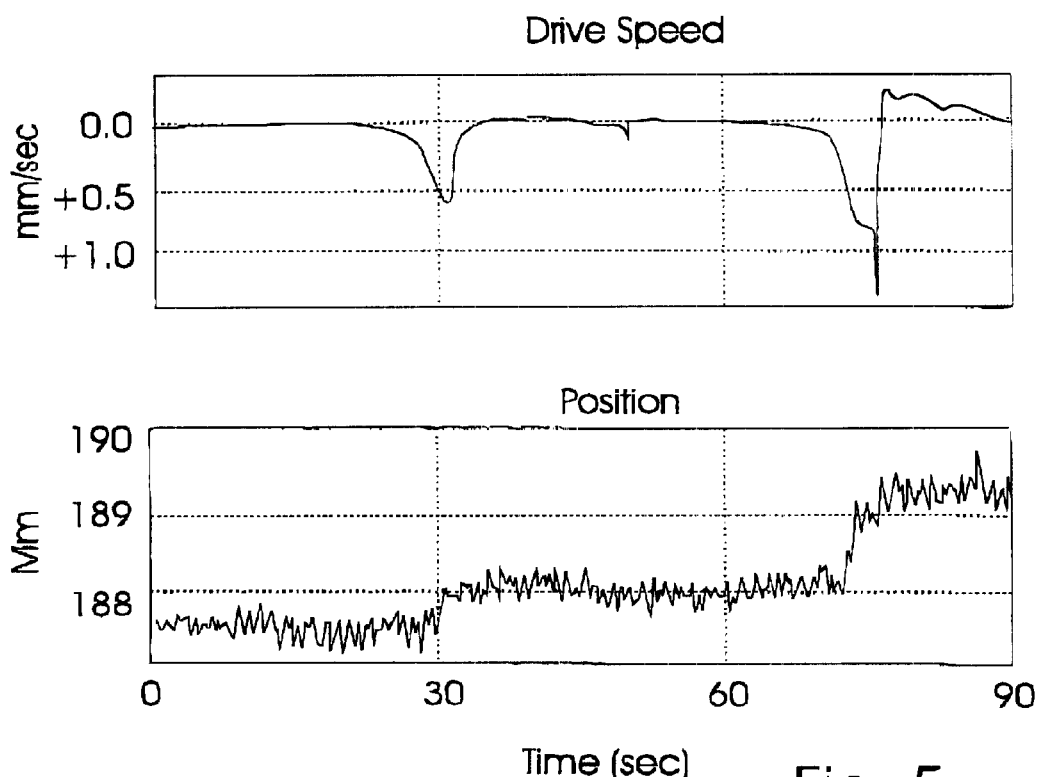
FIG. 5 illustrates drive speed and position as controlled by the invention.

A typical speed and position resulting from this method on a laboratory scale furnace are shown in FIG. 5. At 30 seconds, an impedance spike having a low slope was measured. During this spike there was an increase in $V_{rms}$, and the function of box 40 caused the drive speed to increase for a few seconds, which moved the electrode slightly deeper into the molten slag. At 75 seconds, an impedance spike having a large slope was measured. Referring to FIG. 4, the large increase in $V_{rms}$ caused the difference between $V_{rms}$ and $V_{sp}$ to exceed a predetermined value $V_{max}$ in decision box 34, which changed $D_f$=fast, which increased the drive speed for the duration of the large pulse (box 40). This increase caused the electrode 14 to be moved further into the slag 18, which was necessary because the larger spike indicated that the electrode tip was too close to the surface.

Figure 6:
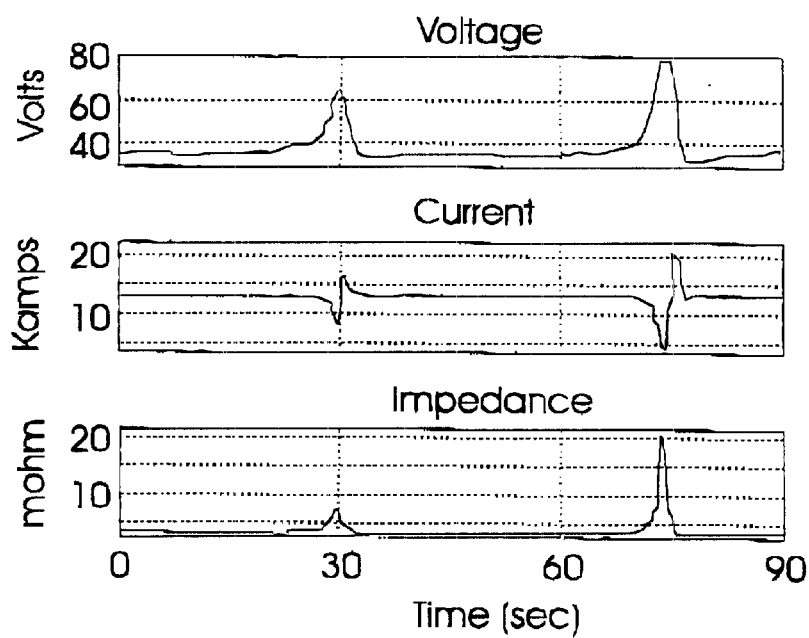
FIG. 6 illustrates comparative changes between voltage, current and impedance.

It is possible to base a controller on a characteristic of voltage, current or related measurements instead of impedance, however, it is preferable to use the impedance, because the magnitude of the relative changes are much greater in impedance. As shown in FIG. 6, the impedance is more responsive since it reflects changes in both current and voltage. Even though the power supply is designed to maintain constant current, typically it is not responsive enough to hold the current constant with such large changes in impedance.

The new method is different from existing methods in two ways. First, it separates the drive response to the impedance spikes from the other voltage variation. This eliminates the confounding effect of having to respond to several factors simultaneously. Since the spikes dominate the variation and the method has been tuned to respond appropriately to the spikes, the control of the electrode drive is more stable and consequently the immersion depth has less variation. Second, this method takes advantage of the naturally occurring indicator of immersion depth, impedance spikes, rather than artificially generating one, swing, to adjust the set point for the immersion depth metric, which is usually voltage. The spikes are better indicators because they are directly related to the immersion depth and they are not affected by the changing properties in the process or how the process is controlled. Consequently, the set point changes will correspond primarily to variation in the depth, so the controller will maintain a more constant depth throughout the melt. Also no additional movement of the electrode is required, as is the case with swing controllers.

This method provides a way to operate ESR at a more constant shallower immersion depth and with better sensitivity to the slag surface than existing methods. Since the method does not generally move the electrode to produce or respond quickly to voltage variations, the basic drive speed variation can be much less. This allows for stable operation at a shallower depth producing better surface quality. In addition because it responds directly to the non-uniform melting observed in ESR, the immersion depth is more constant. Finally, by using the impedance spikes to characterize the immersion depth, the optimum voltage set point is more readily defined. Results from tests of this system have resulted in noticeable improvements in surface quality over existing practice.

Although the invention has been described in detail with particular reference to these preferred embodiments, other embodiments can achieve the same results. Any other metric of the ESR process besides voltage which provides a metric of the proximity of the electrode tip to the surface of the slag pool may be utilized in the practice of the invention. Also any measurable or detectable characteristic besides the slope of the impedance that allows differentiation between the impedance spikes at shallow and deep immersions, could be used to adjust the immersion depth metric. For example, the slag pool temperature decreases as the electrode is submerged, and optical changes at the surface of the slag pool as the electrode nears the surface may also be detectable. Since the most readily available information comprises the voltage and current applied to the system, combinations of this information other than impedance may also be utilized by one of ordinary skill in the art. Also since the impedance spikes are very periodic, the drive speed could be increased in anticipation of the spikes rather than in direct response to the difference between the measured voltage and the voltage set point to improve immersion depth control as well. In addition, the response to impedance spikes indicating a shallow immersion depth does not necessarily need to be discrete or linear, as long as the electrode is driven back down into the slag quickly. Variations and modifications of the present invention will be obvious to those skilled in the art and it is intended to cover in the appended claims all such modifications and equivalents. The entire disclosures of all references, applications, patents, and publications cited above are hereby incorporated by reference.

What is claimed is:

1. A method of controlling electrode drive speed on an electroslag remelting furnace having an electrode that is driven into a molten slag pool, the method comprising the steps of:

initially driving the electrode at a nominal rate consistent with its melting rate and geometry;

adjusting the electrode drive speed by a first amount proportional to the difference between a measured metric of the proximity of the electrode tip to the surface of the slag pool and a set point, and additionally increasing electrode drive speed by a second amount if a measured metric of the proximity of the electrode tip to the surface of the slag pool differs from said set point by a predetermined amount; wherein the second amount is greater than the first amount.

2. The method of claim 1 further comprising the step of adjusting the set point if a characteristic of the measured metric indicative of immersion depth exceeds a first predetermined set value.

3. The method of claim 2 further comprising adjusting the first set point if the characteristic is less than a second predetermined set value.

4. The method of claim 3 wherein said characteristic is a function of periodic fluctuations of impedance generated during remelting, wherein said periodic fluctuations are impedance spikes.

5. The method of claim 4 wherein said characteristic is the rate at which impedance spikes occur with a slope that exceeds a predetermined value.

6. The method of claim 1 wherein in the adjusting step the metric of the proximity of the electrode tip to the surface of the slag pool is the measured electrode voltage.

7. A method of controlling electrode drive speed on an electroslag remelting furnace having an electrode that is driven into a molten slag pool, wherein the electrode and slag pool are part of an electrical circuit, the method comprising the steps of:

monitoring a characteristic of impedance spikes in the electrical circuit, wherein impedance spikes are periodic variations of impedance; and adjusting a set point indicative of electrode immersion depth based upon the characteristic of impedance spikes.

8. The method of claim 7 additionally comprising the step of adjusting electrode drive speed if a measured metric of electrode immersion depth differs from the set point by a predetermined amount.

9. The method of claim 7 wherein the adjusting step comprises adjusting the set point if the characteristic exceeds a first predetermined set value.

10. The method of claim 9 wherein the adjusting step comprises adjusting the set point if the characteristic is less than a second predetermined set value.

11. The method of claim 7 wherein in the adjusting step the metric of electrode immersion depth is electrode voltage.

12. The method of claim 7 wherein the characteristic is the rate at which impedance spikes generated in the electrical circuit occur that have a slope which exceeds a predetermined value.

13. An apparatus for controlling electrode drive speed on an electroslag remelting furnace having an electrode that is driven into a molten slag pool, wherein the electrode and slag pool are part of an electrical circuit, comprising:

means for initially driving the electrode at a nominal rate consistent with the melting rate and geometry;

first adjusting means for adjusting the electrode drive speed by a first amount proportional to the difference between a measured metric of the proximity of the electrode tip to the surface of the slag pool and a set point, and second adjusting means for increasing electrode drive speed by a second amount if a measured metric of the proximity of the electrode tip to the surface of the slag pool differs from a set point by a predetermined amount; wherein the second amount is greater than the first amount.

14. The apparatus of claim 13 further comprising set point adjusting means for adjusting the first set point if a characteristic of the process indicative of immersion depth exceeds a first predetermined set value.

15. The apparatus of claim 14 wherein said set point adjusting means adjusts the first set point if the characteristic is less than a second predetermined set value.

16. The apparatus of claim 15 wherein said characteristic is a function of the impedance spikes generated during remelting.

17. The apparatus of claim 16 wherein said characteristic is the rate at which impedance spikes occur in the electrical circuit with a slope that exceeds a predetermined value.

18. The apparatus of claim 13 wherein in the metric of electrode immersion depth is electrode voltage.

* * * * *